United States Patent
Wang et al.

(10) Patent No.: US 12,118,141 B2
(45) Date of Patent: Oct. 15, 2024

(54) GUIDED OBJECT TARGETING BASED ON PHYSIOLOGICAL FEEDBACK

(71) Applicant: Microsoft Technology Licensing, LLC, Redmond, WA (US)

(72) Inventors: Yu-Te Wang, Redmond, WA (US); Jen-Tse Dong, Bellevue, WA (US)

(73) Assignee: Micrsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 18/123,212

(22) Filed: Mar. 17, 2023

(65) Prior Publication Data

US 2024/0310902 A1   Sep. 19, 2024

(51) Int. Cl.
| | |
|---|---|
| G06F 3/01 | (2006.01) |
| G02B 27/01 | (2006.01) |
| G06F 3/02 | (2006.01) |
| G06F 3/04842 | (2022.01) |

(52) U.S. Cl.
CPC ........... *G06F 3/013* (2013.01); *G02B 27/017* (2013.01); *G06F 3/016* (2013.01); *G06F 3/02* (2013.01); *G06F 3/04842* (2013.01)

(58) Field of Classification Search
CPC . G06F 3/013; G06F 3/016; G06F 3/02; G06F 3/04842; G02B 27/017
See application file for complete search history.

(56) References Cited

U.S. PATENT DOCUMENTS

| | | | |
|---|---|---|---|
| 11,640,204 B2* | 5/2023 | Shenoy ................... | G06F 18/41 345/156 |
| 2006/0101079 A1 | 5/2006 | Morikawa | |
| 2015/0149961 A1* | 5/2015 | Karakotsios .......... | G06F 3/0485 715/810 |
| 2015/0177833 A1 | 6/2015 | Vennstrm et al. | |
| 2017/0068418 A1 | 3/2017 | Tanaka | |
| 2017/0168580 A1* | 6/2017 | Allen ..................... | G06F 3/0237 |
| 2017/0346817 A1* | 11/2017 | Gordon .................. | G06V 40/10 |

(Continued)

FOREIGN PATENT DOCUMENTS

| | | |
|---|---|---|
| WO | 2009089532 A1 | 7/2009 |
| WO | 2022066476 A1 | 3/2022 |

OTHER PUBLICATIONS

U.S. Appl. No. 18/118,849 filed Mar. 8, 2023.

(Continued)

*Primary Examiner* — Ryan A Lubit
(74) *Attorney, Agent, or Firm* — Rainier Patents, P.S.

(57) ABSTRACT

This document relates to employing physiological feedback to aid a user in targeting objects using a computing device. One example relates to a method or technique that can include receiving a user attention signal conveying where a user directs attention. The method or technique can also include, based on the user attention signal, identifying a predicted object that the user intends to target with a targeting mechanism and outputting a visual identification of the predicted object. The method or technique can also include receiving a user reaction signal conveying a physiological reaction of the user to the visual identification of the predicted object. The method or technique can also include, in an instance when the physiological reaction of the user indicates an error, identifying another predicted object that the user intends to target with the targeting mechanism.

20 Claims, 10 Drawing Sheets

(56) References Cited

U.S. PATENT DOCUMENTS

| | | | |
|---|---|---|---|
| 2018/0046851 A1* | 2/2018 | Kienzle | G06F 3/0481 |
| 2019/0034941 A1* | 1/2019 | Chavarria | G06F 3/013 |
| 2019/0046044 A1* | 2/2019 | Tzvieli | A61B 5/14552 |
| 2020/0110862 A1* | 4/2020 | Derakhshani | G06F 18/2148 |
| 2020/0364539 A1 | 11/2020 | Anisimov | |
| 2022/0206566 A1* | 6/2022 | Senkal | G06T 7/70 |
| 2023/0026513 A1 | 1/2023 | Kouider | |
| 2023/0056020 A1* | 2/2023 | Zhang | G06F 3/016 |
| 2023/0229246 A1* | 7/2023 | Gerhard | G06F 3/013 715/700 |

OTHER PUBLICATIONS

Eoanou, Andrea, "Microsoft Editor Is Now Superpowered Using Context IQ To Help You Stay In The Flow Of Your Work", Retrieved From: https://techcommunity.microsoft.com/t5/microsoft-365-blog/microsoft-editor-is-now- superpowered-using-context-iq-to-help/ba-p/2897180, Nov. 2, 2021, 8 Pages.

Abiri, et al., "A comprehensive review of EEG-based brain-computer interface paradigms," J. Neural Eng., vol. 16, No. 1, p. 011001, 2019, 22 pages.

An, et al. "Decoding auditory and tactile attention for use in an EEG-based brain-computer interface," In 2020 8th International Winter Conference on Brain-Computer Interface (Bci), IEEE, 2020. pp. 1-6, 7 pages.

Chavarriaga et al., "Learning From EEG Error-Related Potentials in Noninvasive Brain-Computer Interfaces, " in IEEE Transactions on Neural Systems and Rehabilitation Engineering, 2010, vol. 18, pp. 381-388, 8 pages.

Chiang et al., "A Closed-loop Adaptive Brain-computer Interface Framework: Improving the Classifier with the Use of Error-related Potentials," presented at the International IEEE/EMBS Conference on Neural Engineering, 2021, pp. 487-490, 4 pages.

Ferrez et al., "Error-Related EEG Potentials Generated During Simulated Brain-Computer Interaction," in IEEE Transactions on Biomedical Engineering, 2008, vol. 55, pp. 923-929, 7 pages.

Holroyd et al., "The neural basis of human error processing: reinforcement learning, dopamine, and the error-related negativity," Psychol Rev, vol. 109, No. 4, pp. 679-709, 2002, 31 pages.

Klingner, et al., "Measuring the task-evoked pupillary response with a remote eye tracker," in Proceedings of the 2008 symposium on Eye tracking research & applications, New York, NY, USA, 2008, pp. 69-72, 4 pages.

Kristensson et al., "Design and Analysis of Intelligent Text Entry Systems with Function Structure Models and Envelope Analysis," in Proceedings of the 2021 CHI Conference on Human Factors in Computing Systems, May 2021, pp. 1-12, 12 pages.

Kruger, et al., "Measuring the impact of subtitles on cognitive load: eye tracking and dynamic audiovisual texts," in Proceedings of the 2013 Conference on Eye Tracking South Africa, Aug. 2013, pp. 62-66, 5 pages.

Macknik et al., "Neuronal correlates of visibility and invisibility in the primate visual system," Nat Neurosci, vol. 1, No. 2, Jun. 1998, pp. 144-149, 8 pages.

Mehdizadeh et al., "EEG and Eye-Tracking Error-Related Responses During Predictive Text Interactions: A Bci Case Study," in 2023 45th Annual International Conference of the IEEE Engineering in Medicine & Biology Society (EMBC), Jul. 2023, pp. 1-4, 4 pages.

Palin, et al., "How do People Type on Mobile Devices ?: Observations from a Study with 37,000 Volunteers," in Proceedings of the 21st International Conference on Human-Computer Interaction with Mobile Devices and Services, Oct. 2019, pp. 1-12, 12 pages.

Peirce et al., "PsychoPy2: Experiments in behavior made easy," Behav Res, vol. 51, Feb. 2019, pp. 195-203, 9 pages.

Salazar-Gomez, et al., "Correcting robot mistakes in real time using EEG signals," in 2017 IEEE International Conference on Robotics and Automation (ICRA), 2017, pp. 6570-6577, 9 pages.

U.S. Appl. No. 18/118,849, filed Mar. 8, 2023, 55 pages.

Zander, et al., "Towards passive brain-computer interfaces: applying brain-computer interface technology to human-machine systems in general," Journal of Neural Engineering, vol. 8, Issue No. 2, Mar. 2011, 5 pages.

Vasiljevic, et al., "Brain-Computer Interface Games Based on Consumer-Grade EEG Devices: A Systematic Literature Review," International Journal of Human-Computer Interaction, vol. 36, No. 2, Jan. 2020, 38 pages.

International Search Report and Written Opinion received for PCT Application No. PCT/US2024/017189, May 22, 2024, 19 pages.

International Search Report and Written Opinion received for PCT Application No. PCT/US2024/019286, Jun. 10, 2024, 16 pages.

* cited by examiner

APPLICATION SCENARIO 200

GUIDED OBJECT TARGETING BASED ON PHYSIOLOGICAL FEEDBACK

BACKGROUND

There are many computing scenarios where users employ a targeting mechanism, such as a cursor, to target a computer-generated or real-world object. In some scenarios, it can be relatively difficult for a user to accurately target an object of interest. For example, sometimes two or more objects can be crowded together or overlapping when viewed by the user, and the user may unintentionally target the wrong object.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The description generally relates to techniques for guiding users to target objects using a targeting mechanism, based on physiological feedback received from the users. One example relates to a method or technique that can include receiving a user attention signal conveying where a user directs attention. The method or technique can also include, based on the user attention signal, identifying a predicted object that the user intends to target with a targeting mechanism and outputting a visual identification of the predicted object. The method or technique can also include receiving a user reaction signal conveying a physiological reaction of the user to the visual identification of the predicted object. The method or technique can also include, in an instance when the physiological reaction of the user indicates an error, identifying another predicted object that the user intends to target with the targeting mechanism.

Another example includes a system that can include a processor and a storage medium. The storage medium can store instructions which, when executed by the processor, cause the system to, based at least on a user attention signal, identify a predicted object that a user intends to target, and output an identification of the predicted object. The instructions can also cause the system to, based on a user reaction signal indicating that the predicted object is erroneous, identify another predicted object that the user intends to target. The instructions can also cause the system to perform a selection action on the another predicted object responsive to a selection input.

Another example includes a computer-readable storage medium storing instructions which, when executed by a computing device, cause the computing device to perform acts. The acts can include receiving a user attention signal conveying where a user directs attention. The acts can also include, based on the user attention signal, identifying a predicted object that the user intends to target with a targeting mechanism and outputting a visual identification of the predicted object. The acts can also include receiving a user reaction signal conveying a physiological reaction of the user to the visual identification of the predicted object. The acts can also include, in an instance when the physiological reaction of the user indicates an error, identifying another predicted object that the user intends to target with the targeting mechanism.

The above-listed examples are intended to provide a quick reference to aid the reader and are not intended to define the scope of the concepts described herein.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

DETAILED DESCRIPTION

Figure 1:
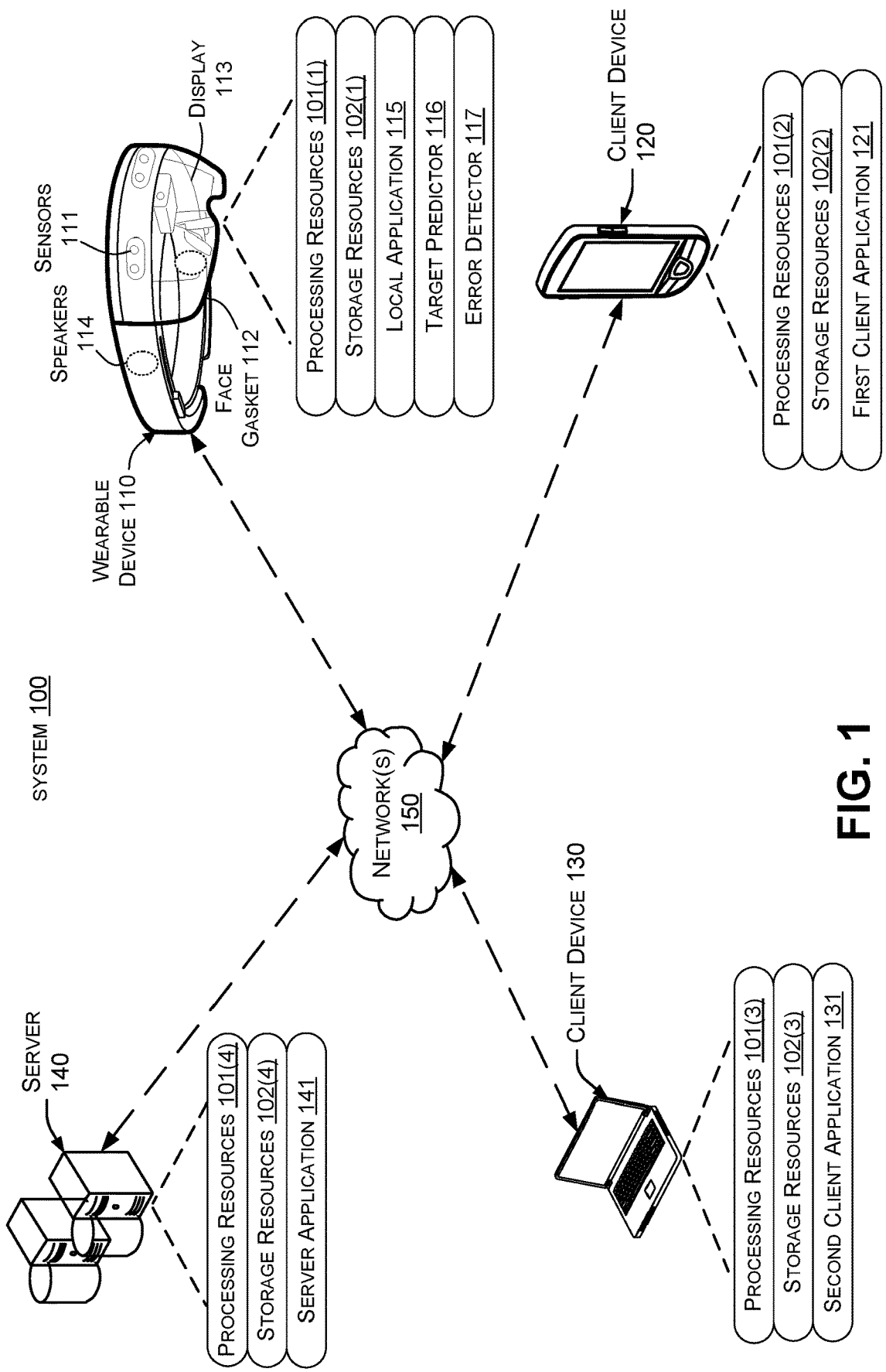
FIG. 1 illustrates an example system, consistent with some implementations of the present concepts.

As noted previously, some computing scenarios involve users targeting one or more computer-generated objects or real-world objects. For instance, consider a virtual or augmented reality application where a user intends to target a particular virtual object from multiple closely-spaced or overlapping virtual objects. If the user inadvertently targets the wrong object, this can cause user frustration and have a strong negative impact on usability.

One way to aid the user in targeting the correct object is to receive explicit error feedback from a user. For instance, when a user inadvertently targets the wrong object, the user can push a button (e.g., a backspace button) or perform an undo gesture to indicate that the wrong object has been targeted. However, this is burdensome on the user, time-consuming, and also tends to erode user trust.

It is also possible to capture implicit error feedback from a user when a user perceives an error by a computing system, e.g., that the wrong object has been targeted. Users subconsciously react to various external stimuli in a manner that can be sensed without requiring the user to provide explicit feedback. For instance, biosignals such as electroencephalogram signals or changes in pupil diameter can provide insights into how users perceive the behavior of a computing system. Implicit neurophysiological feedback generally occurs in a short window after a user perceives an external stimulus. For instance, if a user perceives that a computing system has incorrectly targeted an unintended object, the user's physiological reaction can be captured within approximately the next second after the user becomes aware that the wrong object has been targeted.

The disclosed techniques employ the use of a user attention signal to predict which object a user intends to target with a targeting mechanism. Then, a visual identification of the predicted object is presented to the user, while measuring a reaction signal from the user. If the reaction signal indicates that the user perceives an error, the prediction can be revised to target a different object. Thus, the reaction signal serves as implicit feedback that allows the prediction to be updated without necessarily receiving explicit feedback from the user. As a consequence, users can be provided with an improved experience when using targeting mechanisms to target objects that are located closely together and otherwise difficult to target accurately.

Definitions

For the purposes of this document, the term "targeting mechanism" refers to any movable mechanism that a user can employ to target computer-generated content. For instance, cursors, mouse pointers, and other visible indicators of targeted objects are examples of targeting mechanisms that can be controlled by a user. The term "navigation input" refers to any type of input received by a computer that can control a targeting mechanism. The term "target" refers to moving a targeting mechanism to a particular object, and the term "select" means to perform an action on a targeted object. For instance, moving a targeting mechanism over a letter can result in the letter being targeted, and performing a selection action while the letter is targeted can result in the letter being entered as text.

The term "user attention signal" refers to any type of signal that can be used to infer whether a user is directing their attention to a real-world object or a virtual object output by a computer. For instance, one type of user attention signal is a gaze tracking signal indicating the coordinates where a user is gazing at on a display. As discussed more below, gaze coordinates can be used to infer that a user is gazing at a particular object with a certain probability. Other examples of user attention signals can convey spatial attention, auditory, or tactile attention, as discussed further below. The term "visual identification" refers to any visual presentation on a display that can be used to indicate which object a user is currently targeting using a targeting mechanism. For instance, a visual identification can be a change in color of a particular object, causing the object to flash, brighten, darken, change size or font, etc.

The term "user reaction signal" refers to any type of signal that can be used to infer whether a user believes that an error is present when presented with a visual identification that a particular object has been targeted. For instance, a user reaction signal could be an electroencephalogram ("EEG") signal, a pupil diameter measurement, etc., that conveys the physiological reaction of a user to a particular stimulus. The term "biosignal" refers to any signal that can be used to determine the physiological reaction of a user to a stimulus, e.g., by measuring a user's body. Biosignals can be employed both as user attention signals and as user reaction signals, as described further herein.

An "application" is a computing program, e.g., that responds to commands from a user. An application can be a virtual reality application that immerses the user entirely or almost entirely in a virtual environment. An application can also be an augmented reality application that presents virtual content in a real-world setting. Other examples of applications include productivity applications (e.g., word processing, spreadsheets), video games, digital assistants, teleconferencing applications, email clients, web browsers, operating systems, Internet of Things (IoT) applications, etc.

The term "model" is used generally herein to refer to a range of processing techniques, and includes models trained using machine learning as well as hand-coded (e.g., heuristic-based) models. For instance, as noted below, a machine-learning model could be a neural network, a support vector machine, a decision tree, a random forest, etc. Models can be employed for various purposes as described below, such as classification of physiological reactions into a first classification indicating that a user does not perceive an error and a second classification indicating that the user perceives an error. U.S. patent application Ser. No. 18/118,849, filed Mar. 8, 2023, includes additional details on how physiological reactions can be employed to detect errors, and is incorporated by reference herein in its entirety.

Example System

The present concepts can be implemented in various application scenarios and on various devices. FIG. 1 shows an example system 100 in which the present implementations can be employed, as discussed below.

As shown in FIG. 1, system 100 includes a wearable device 110, a client device 120, a client device 130, and a server 140, connected by one or more network(s) 150. Note that the client devices can be embodied both as mobile devices such as smart phones or tablets, as well as stationary devices such as desktops, server devices, etc. Likewise, the servers can be implemented using various types of computing devices. In some cases, any of the devices shown in FIG. 1, but particularly the server, can be implemented in data centers, server farms, etc.

Certain components of the devices shown in FIG. 1 may be referred to herein by parenthetical reference numbers. For the purposes of the following description, the parenthetical (1) indicates an occurrence of a given component on wearable device 110, (2) indicates an occurrence of a given component on client device 120, (3) indicates an occurrence on client device 130, and (4) indicates an occurrence on server 140. Unless identifying a specific instance of a given component, this document will refer generally to the components without the parenthetical.

Generally, the devices 110, 120, 130, and/or 140 may have respective processing resources 101 and storage resources 102, which are discussed in more detail below. The devices may also have various modules that function using the processing and storage resources to perform the techniques discussed herein. The storage resources can include both persistent storage resources, such as magnetic or solid-state drives, and volatile storage, such as one or more random-access memory devices. In some cases, the modules are provided as executable instructions that are stored on persistent storage devices, loaded into the random-access memory devices, and read from the random-access memory by the processing resources for execution.

Wearable device 110 can include one or more sensors 111, which provide information about the location and/or movement of a user of the device (e.g., the user's head, eyes, facial muscles, etc.). The sensors can be internal and/or external. One specific type of sensor is an EEG sensor that monitors electrical signals reflecting brain activity. An EEG sensor can be worn around the scalp, in a headband, behind the ear, inside the ear (e.g., in an earbud), etc. Another type of sensor is an inertial measurement unit ("IMU") configured to provide acceleration, gyroscopic, and/or magnetic measurements. In some cases, an IMU can be provided in a face gasket 112 of the wearable device, which can surround display 113. In other cases, the IMU can be provided in smart headphones, earbuds, a cochlear implant, or in any other location where tongue movements can be detected. Other types of sensors can include photoplethysmography (PPG) sensors, position tracking sensors, eye tracking sensors that can output gaze tracking signals and/or measure pupil diameter, etc. Note that some sensors may be provided separately and are not necessarily components of the wearable device. For instance, external sensors can communicate sensor data to the wearable device using wired or wireless (e.g., Bluetooth) communication links.

Visual content can be presented on the display 113 of the wearable device 110, and sound can be output using one or more speakers 114. The wearable device can also include a local application 115, which can receive user input targeting and/or selecting various virtual objects output by the local application and/or real-world objects visible to the user while employing the local application. The wearable device can also include a target predictor 116, which can predict which virtual or real-world object that the user intends to target, e.g., based on a user attention signal such as a gaze tracking signal. The target predictor can also output a visual identification of which object the user is predicted to target. The wearable device can also include an error detector 117, which can obtain user reaction signals to determine whether a user perceives an error after the visual identification is presented. If the error detector determines that the user perceives an error, the error detector can output an error indication to the target predictor, which can update the prediction to another object. In some cases, the error detector and/or target predictor can be part of the local application, and in other cases can be provided by an operating system of the wearable device to provide predictive targeting functionality to multiple applications.

In some cases, the wearable device can interact with remote applications as well. For instance, the user may use the wearable device 110 to interact with a first client application 121 on client device 120 and with a second client application 131 on client device 130. For instance, the user can control their personal devices such as phones, tablets, laptops, etc., over a local wireless connection. The user may also use the wearable device to interact with a server application 141 on server 140, e.g., over a wide-area network.

Note that FIG. 1 illustrates just one potential configuration and that the concepts conveyed herein can be employed in a wide range of other configurations. For example, in some cases, target prediction or error detection can be performed remotely from the wearable device 110, e.g., on a remote server or on a companion device, such as a tablet, phone, laptop, or in communication with the wearable device.

Example Application Scenario

Figure 2A:
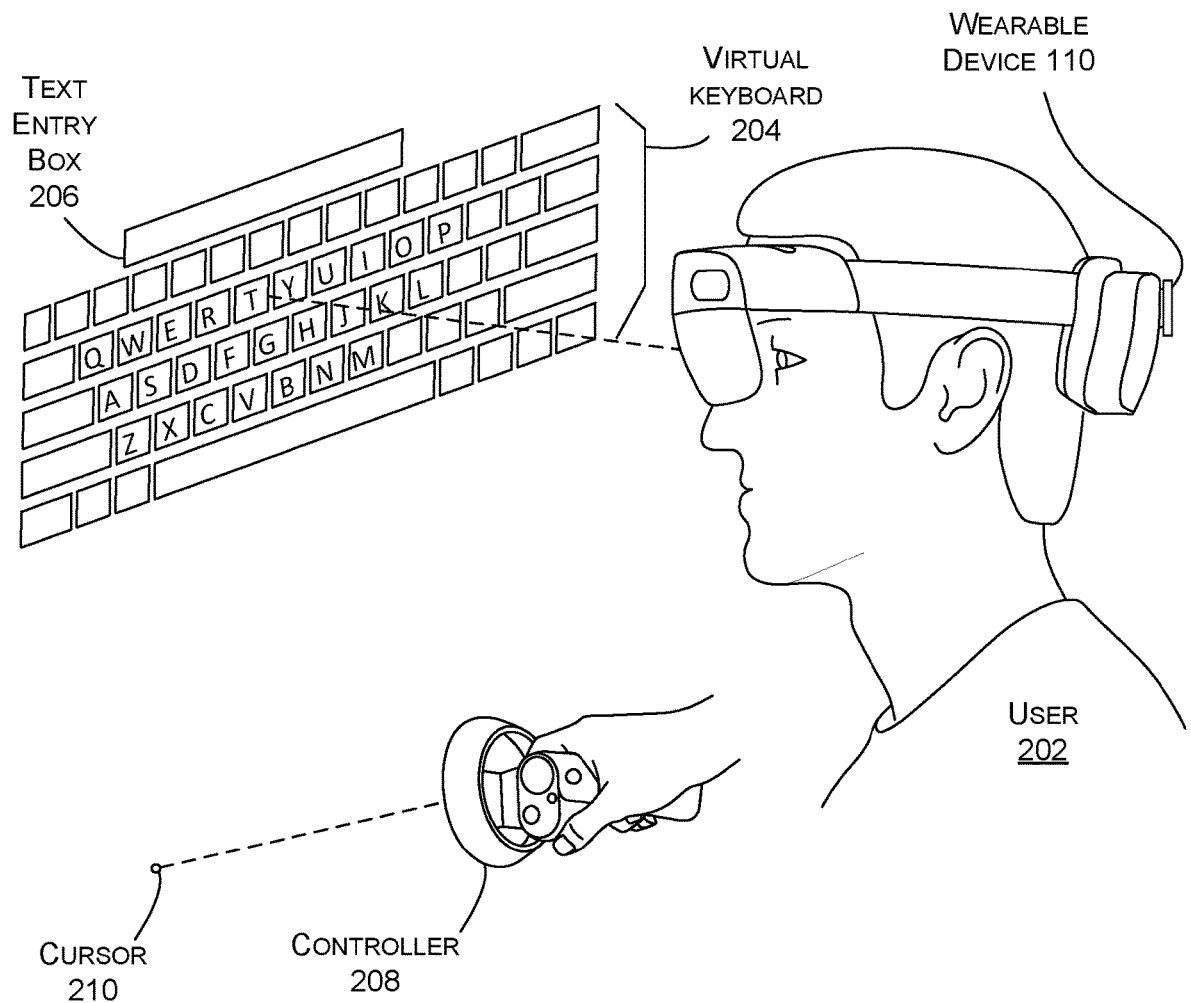
FIGS. 2A-2E illustrate an example application scenario over a period of time, consistent with some implementations of the present concepts.
Figure 2B:
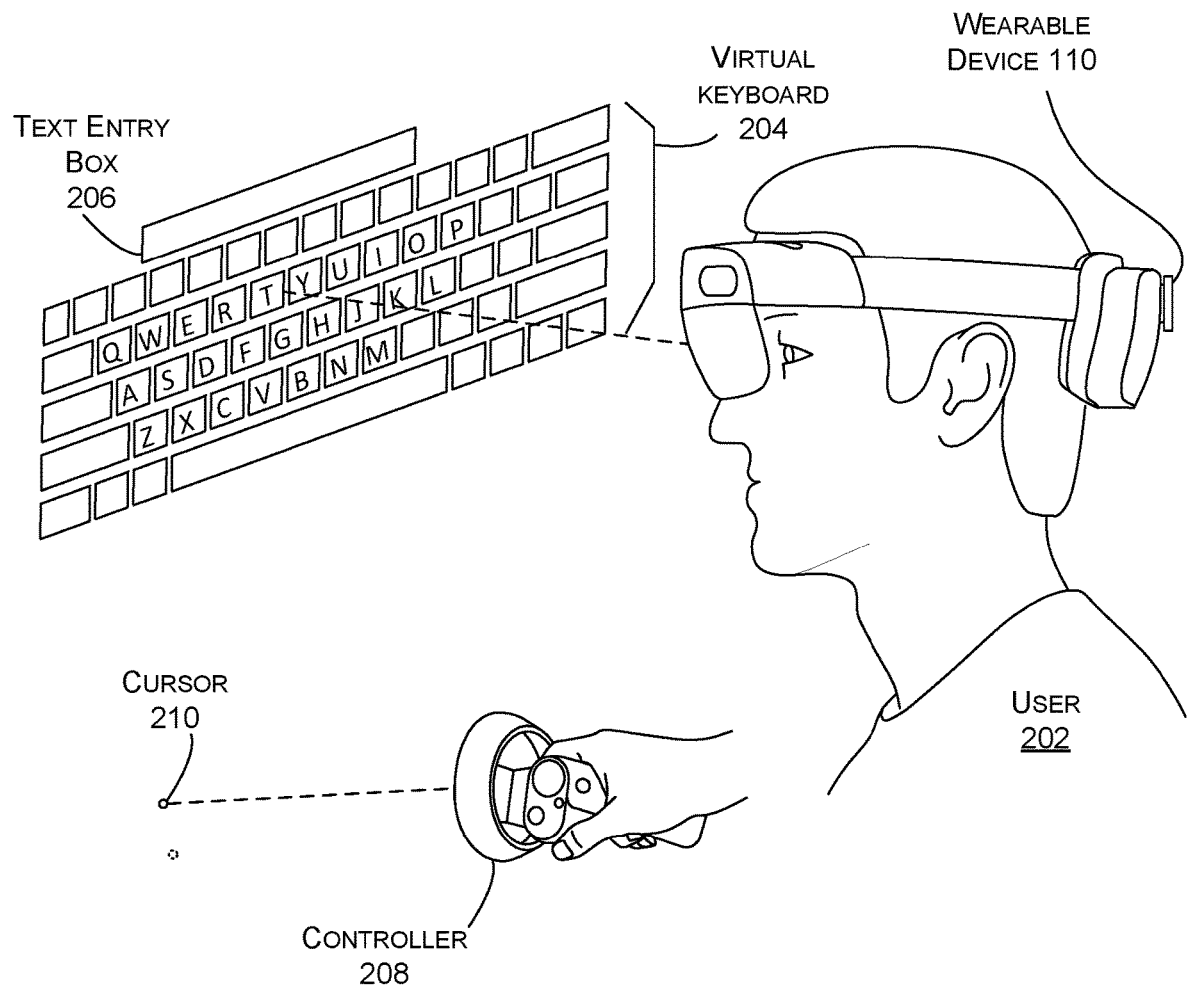
Figure 2C:
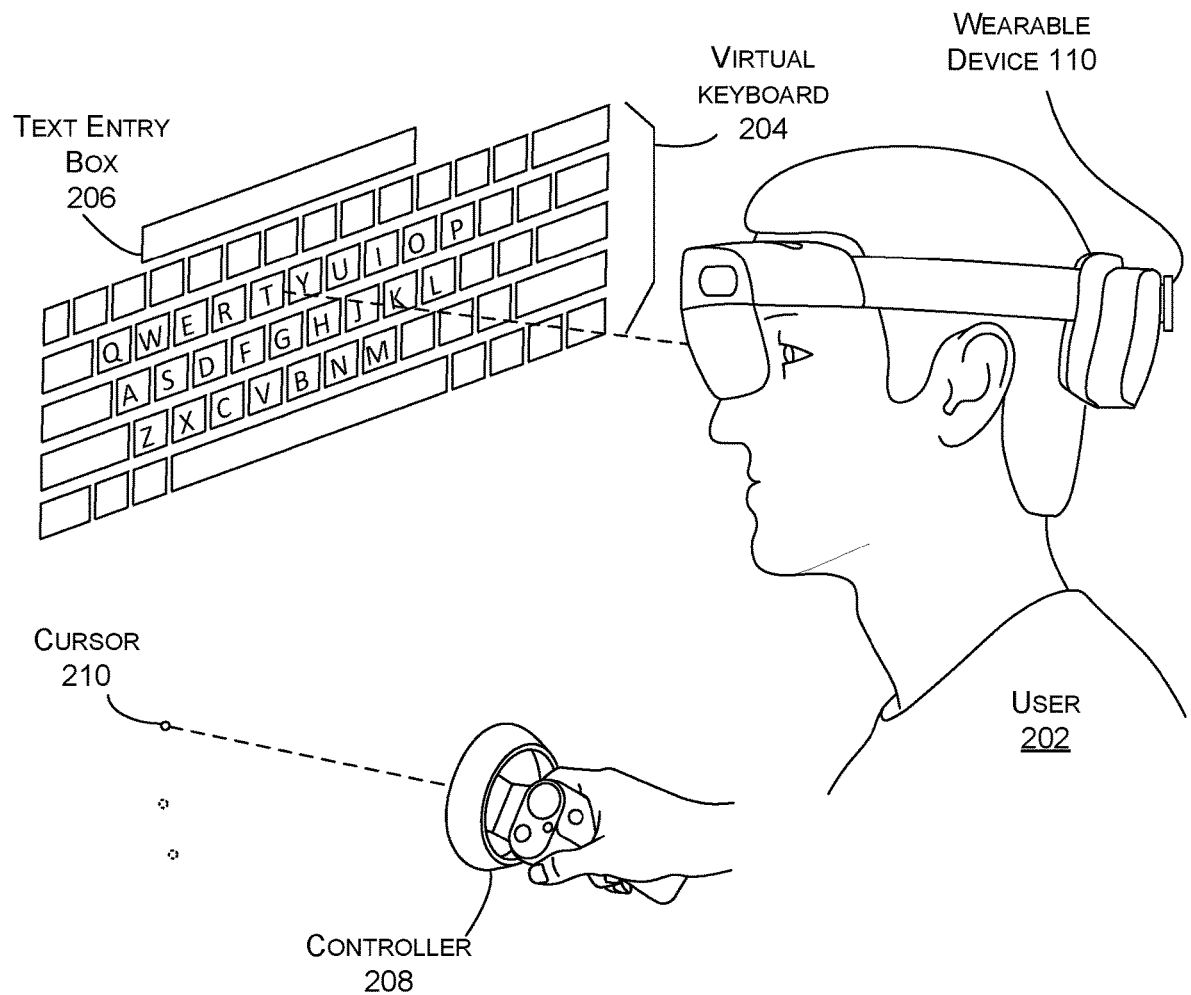

FIGS. 2A through 2E illustrate an example application scenario 200 that conveys how user attention signals and user reaction signals can be employed to provide a predictive targeting experience. As shown in FIG. 2A, user 202 wearing wearable device 110 is shown a virtual keyboard 204 to enter text into a text entry box 206. The user can employ controller 208 to move a cursor 210 toward the virtual keyboard. As shown in FIGS. 2B and 2C, the user continues moving the cursor 210 with controller 208 toward the virtual keyboard.

Figure 2D:
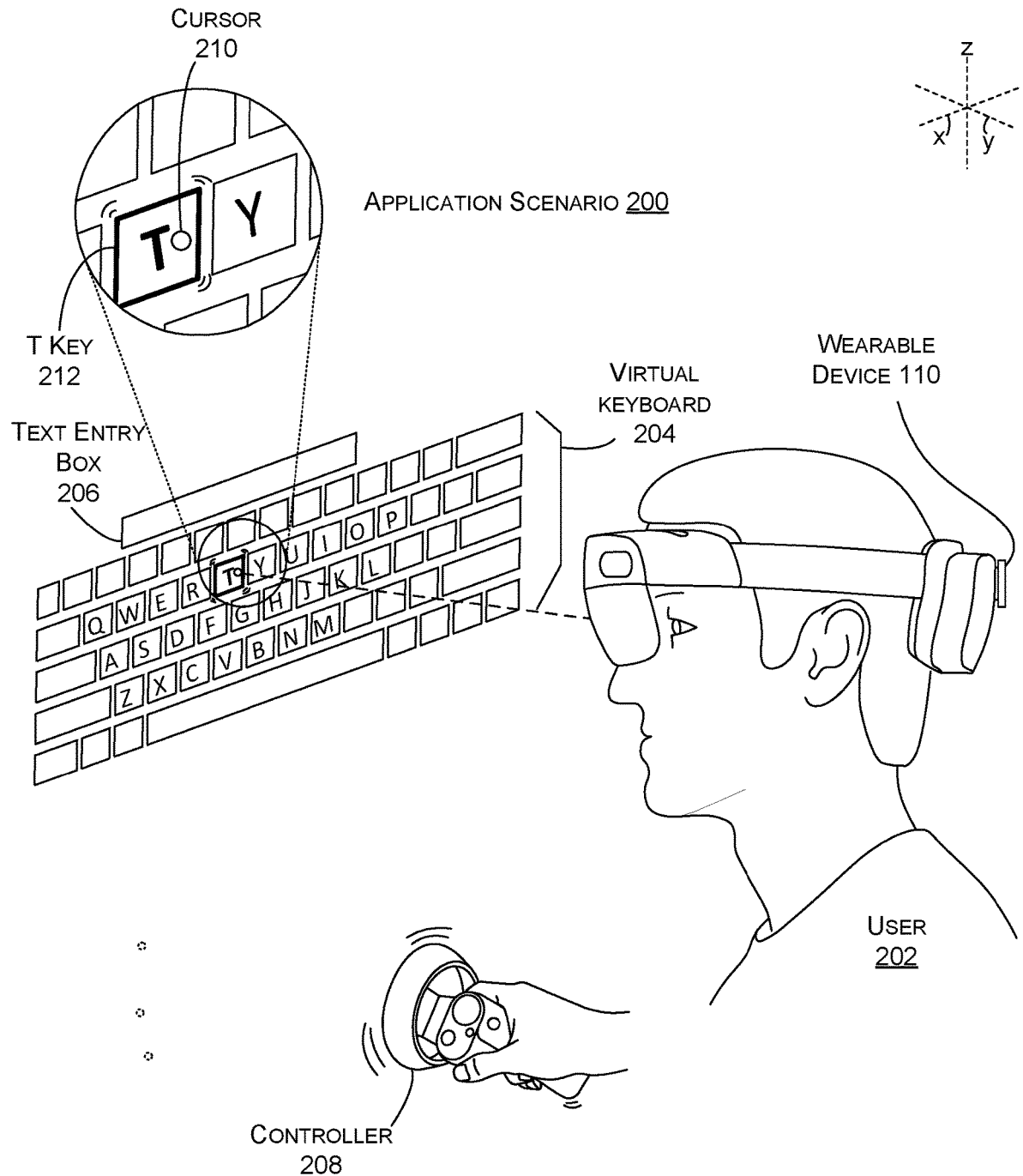

As the user moves the cursor toward the virtual keyboard 204, they may scan with their eyes over individual letters of the virtual keyboard. As the user scans, gaze tracking using one or more sensors can be employed to determine where the user's gaze is directed. Based on the user's gaze, a prediction can be made as to which object the user intends to target. As shown in FIG. 2D, a prediction is made that the user intends to target the T key 212. A visual identification that the user intends to target the T key can be presented, e.g., by bolding the letter "T," causing the letter "T" to flash, etc. In addition, a jump action can be performed by automatically moving the cursor 210 over the T key. Further, haptic feedback can be provided via the controller 208 to inform the user that a targeting prediction has been made. In some cases, audio feedback (e.g., "You have targeted the letter T") may be output to the user with or without haptic feedback.

Figure 2E:
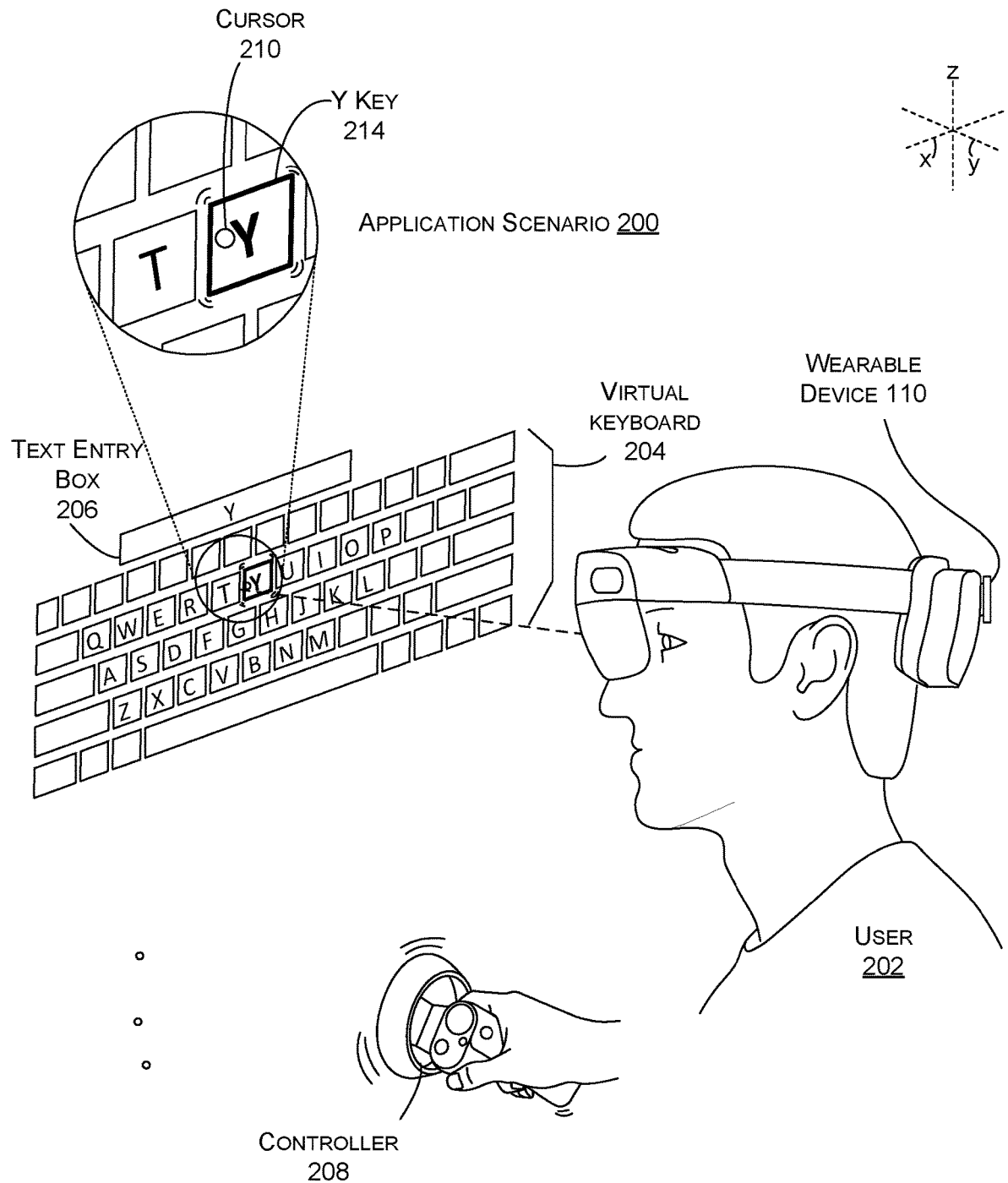

Assume that the user is actually intending to target the letter Y rather than the letter T. A user reaction signal indicating an error can be received. At this time, the predicted object can be updated to the Y key 214, as shown in FIG. 2E. The letter Y can be visually identified, and haptic and/or audio feedback can be provided again to indicate that the predicted object has been updated. When the user reaches the letter they wish to target, they can perform a selection input (e.g., a button press on a handheld controller, a facial gesture, a hand gesture, etc.). The letter can then be entered into the text entry box 206 responsive to the selection input.

FIGS. 2A-2E illustrate the disclosed concepts using a text entry example, where the object targeted by a user is a letter. However, as discussed more below, the disclosed implementations can be employed in a wide range of application scenarios to target many different kinds of objects. For instance, the disclosed techniques could be used to determine which player a user intends to throw to in a sports game, whether a user intends to shoot at a first character or another character partially obscured by the first character in an adventure game, which block in a (potentially moving) tower of blocks that the user wants to target, etc.

Object Targeting Probabilities

Figure 3A:
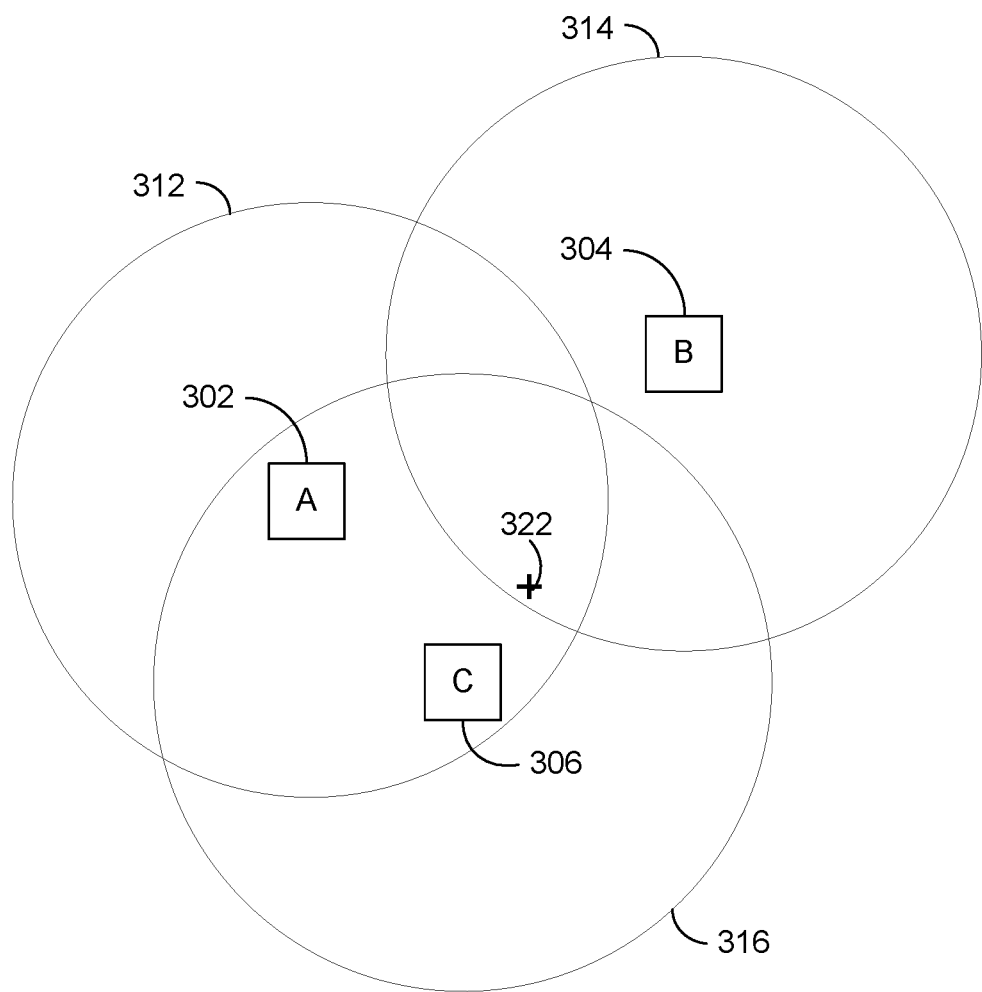
FIGS. 3A-3C illustrate examples of how object targeting probabilities can be determined, consistent with some implementations of the present concepts.
Figure 3B:
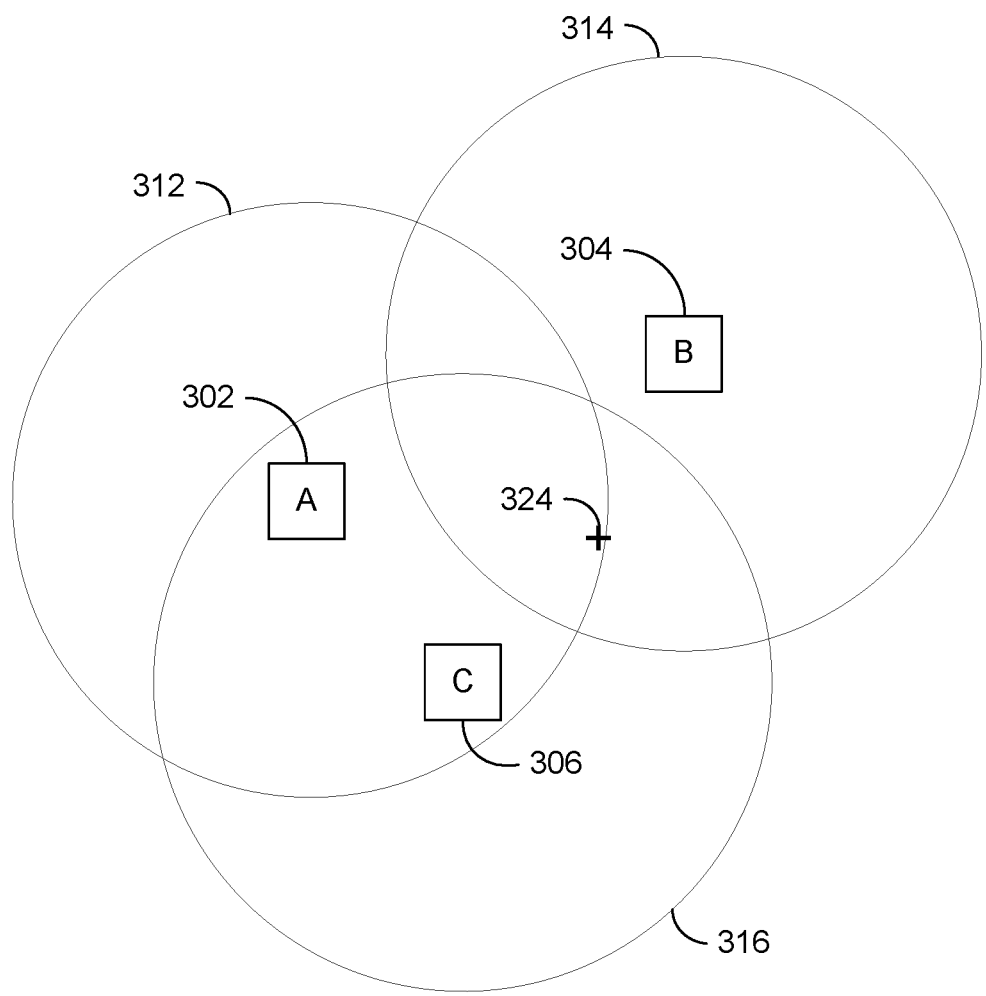
Figure 3C:
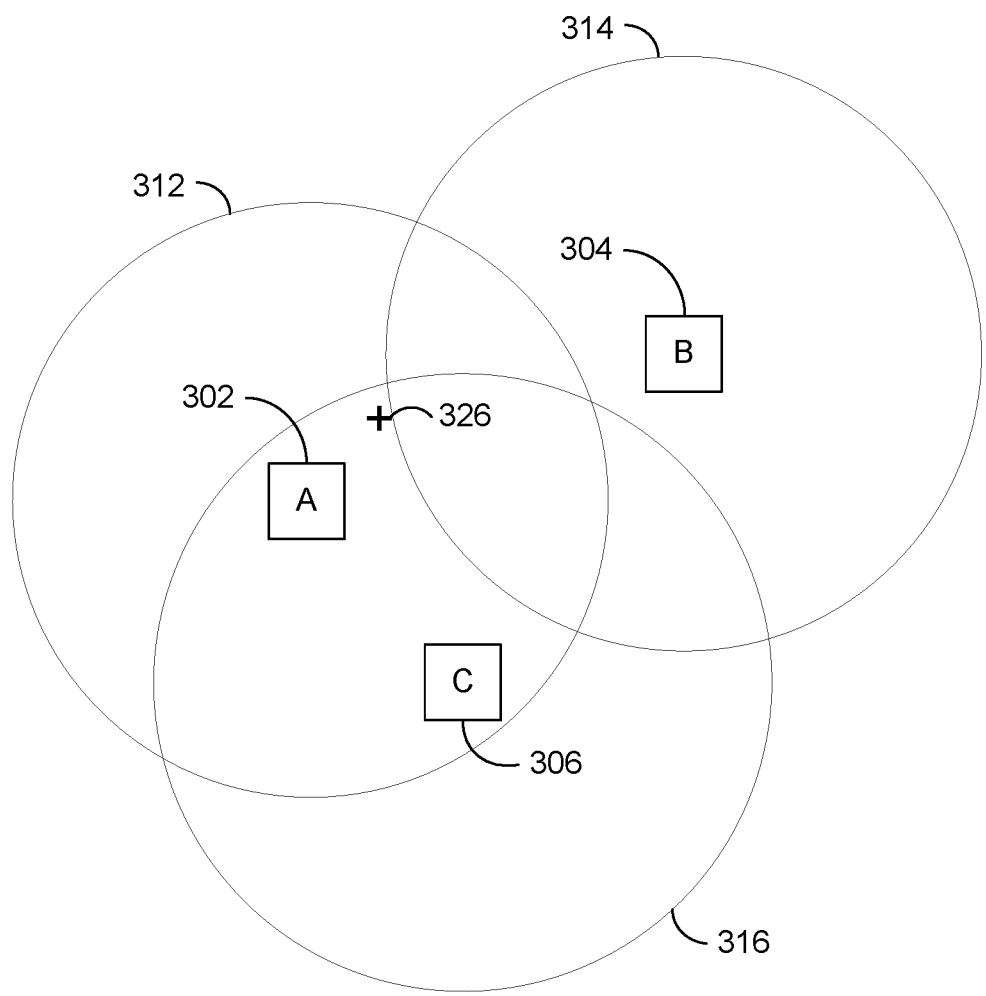

One way to predict which object a user intends to target is to map a user attention signal to respective targeting probabilities for multiple objects. FIGS. 3A-3C illustrate an example technique for assigning targeting probabilities to different objects. More specifically, FIG. 3A show how attention-based coordinates, such as those derived via gaze tracking, can be mapped to targeting probabilities, where the targeting probabilities are proportional to the distance of the attention-based coordinates from the center of each respective object.

FIG. 3A shows object A 302, object B 304, and object C 306. For the purposes of example, each object is shown as a square, although the shapes and sizes of each object can vary in practice. Circles can be generated (although not necessarily displayed) around each object. As shown in FIG. 3A, a circle 312 is drawn around object A, a circle 314 is drawn around object B, and a circle 316 is drawn around object C.

FIG. 3A shows attention-based coordinates 322, which can be obtained from an eye tracking sensor. Here, the attention-based coordinates are located nearest to the center of object C 306, but also within circle 312 around object A 302 and circle 314 around object B 304. Thus, while each object is a potential target, object C is the highest probability targeted object. Since the attention-based coordinates are nearer to the center of object A than the center of object B, the next-highest probability object is object A. For instance, respective targeting probabilities given attention-based coordinates 322 could be—object C, 65%, object A, 25%, object B, 10%.

In FIG. 3B, attention-based coordinates 324 are located nearest to the center of object B 304 but within circle 312 around object A 302 and circle 316 around object C 306. Thus, while each object is a potential target, object B is the highest probability targeted object. Since the attention-based coordinates are nearer to the center of object C than the center of object A, the next-highest probability object is object C. For instance, respective targeting probabilities given attention-based coordinates 324 could be—object B, 60%, object C, 30%, object A, 10%.

In FIG. 3C, attention-based coordinates 326 are nearest to the center of object A 302, within the circle 316 around object C 306, and outside the circle 314 for object B 304. Thus, object B can be excluded as a potential target, and object A is the highest probability targeted object followed by object C. For instance, respective targeting probabilities given attention-based coordinates 326 could be—object A, 90%, object C, 10%.

Example Method

Figure 4:
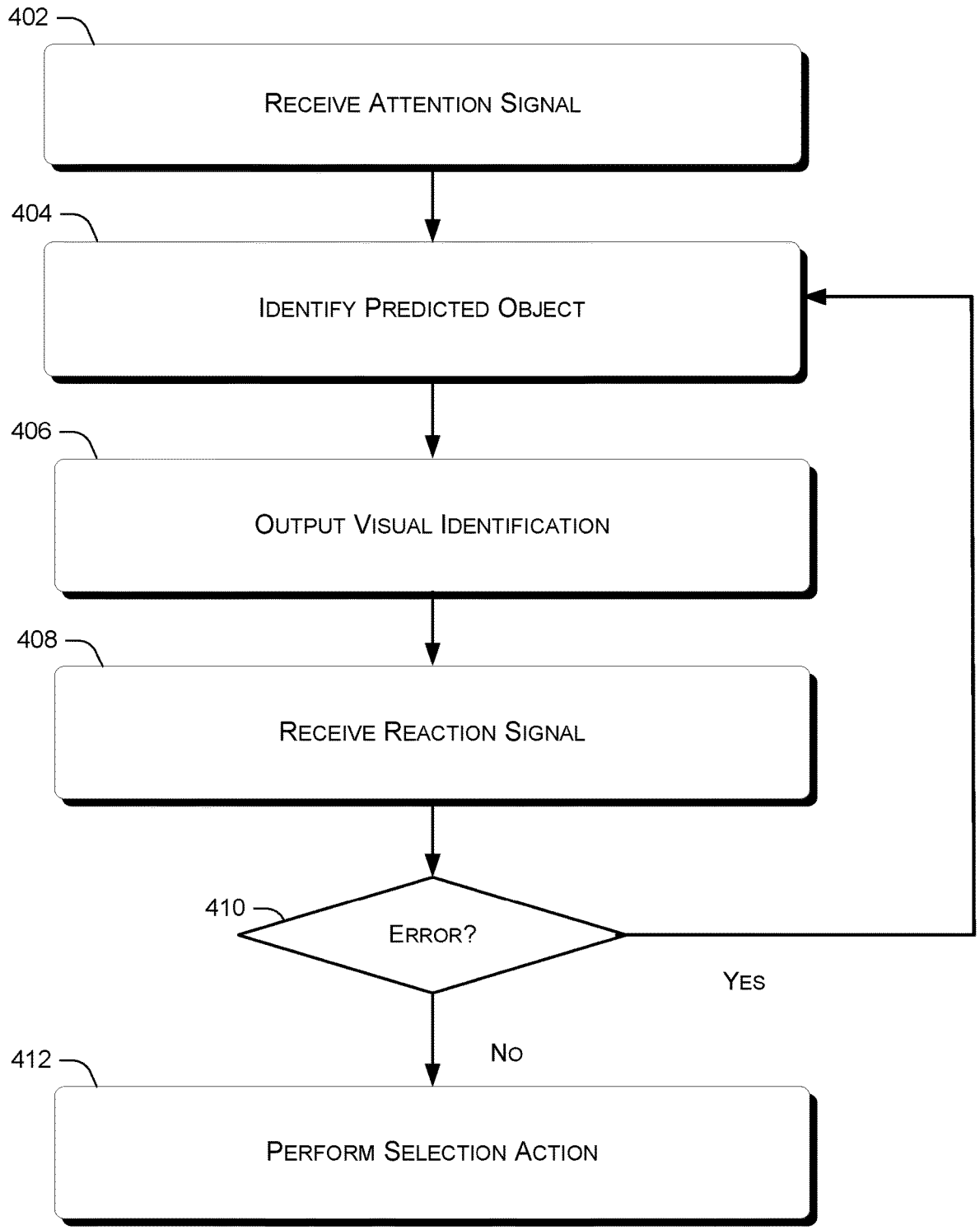
FIG. 4 is a flowchart of an example method or technique for guiding user interaction with one or more objects, consistent with some implementations of the disclosed techniques.

FIG. 4 illustrates an example method 400 for guided object targeting using physiological feedback, consistent with some implementations of the present concepts. Method 400 can be implemented on many different types of devices, e.g., by one or more wearable devices, by one or more cloud servers, by one or more client devices such as laptops, tablets, or smartphones, or by combinations of one or more wearable devices, servers, client devices, etc.

Method 400 begins at block 402, where a user attention signal is received. The user attention signal can convey where a user's attention is directed. For instance, the user attention signal can be obtained from an eye tracking sensor, and can convey coordinates where the user's gaze is directed. For instance, the user's attention could be directed at computer-generated objects such as words, animations, graphical icons, augmented or virtual reality content, or real-world objects such as other humans, animals, vehicles, trees, furniture, etc.

Method 400 continues at block 404, where the user attention signal is employed to identify a predicted object that the user intends to target with a targeting mechanism. For instance, referring back to FIG. 2D, the predicted object could be the T key 212. In some cases, the predicted object can be identified when the user moves a targeting mechanism within a threshold distance (e.g., a distance in pixels) of a given object, e.g., using navigation inputs from a mouse, controller, hand gesture, etc.

Method 400 continues at block 406, where a visual identification of the predicted object is output. For instance, referring back to FIG. 2D, the T key 212 was shown in bold. Visual identifications can also involve causing a predicted object to flash, move, change color, change size, showing an arrow pointing at the predicted object, etc. In some cases, block 406 can also involve outputting haptic and/or audio feedback concurrently with the visual identification to indicate to the user that a predicted object has been identified. In some cases, block 406 can also involve performing a jump action that moves a targeting mechanism from the most recent location to a location over the predicted object, as shown by the movement of cursor 210 from FIGS. 2C to 2E.

Method 400 continues at block 408, where a user reaction signal is received that conveys a physiological reaction of the user to the prediction. For instance, the user reaction signal can be obtained from sensors such as EEG sensors, pupillary diameter measurements, etc. In some cases, the reaction signal is sampled continuously over a longer period of time, and a portion of the reaction signal occurring within a specified time window (e.g., one second) is extracted, starting at the time when the visual identification is output. In other cases, sampling of the reaction signal is initiated when the user directs their attention to the prediction for the specified window of time.

Method 400 continues at decision block 410, where it is determined whether the physiological reaction indicates that the user perceives an error responsive to directing attention to the predicted object. One way to identify an error in a user reaction signal is to determine whether a specified time window (e.g., one second) occurring after the user directs attention to the prediction includes an error-related potential. Another way to identify errors include determining whether the user's pupillary diameter increases above a specified percentage (e.g., a threshold), as well as other techniques described in the '849 application.

If the user's physiological reaction indicates an error, method 400 continues from decision block 410 back to block 404, where another predicted object is identified and blocks 406 and 408 are performed again until a stopping condition is reached. For instance, a stopping condition could involve the user performing a selection action on a particular predicted object, directing their attention away from the predicted object, manually selecting an object using a controller or other input device, etc.

If the user's physiological reaction does not indicate an error, method 400 continues from decision block 410 to block 412, where a selection action can be performed on the predicted object responsive to a selection input. For instance, a user can press a button on a controller, make a selection gesture, etc. For instance, referring back to FIG. 2E, the selection action can cause text entry box 206 to be populated with the letter "Y."

In some cases, method 400 can be performed partly or entirely locally on wearable device 110. In other cases, part or all of the method is performed by a different computing device. For instance, any of client device 120, client device 130, and/or server 140 can perform part or all of method 400.

Machine Learning Overview

There are various types of machine learning frameworks that can be trained to perform a given task, such as determining whether a user reaction signal indicates an error. Support vector machines, decision trees, and neural networks are just a few examples of machine learning frameworks that have been used in a wide variety of applications, such as image processing and natural language processing.

A support vector machine is a model that can be employed for classification or regression purposes. A support vector machine maps data items to a feature space, where hyperplanes are employed to separate the data into different regions. Each region can correspond to a different classification. Support vector machines can be trained using supervised learning to distinguish between data items having labels representing different classifications. One way to employ a support vector machine is for binary classification of user reaction signals to determine whether the use reaction signals indicate that a user perceives an error in a prediction made by a prediction model, e.g., whether a predicted object that the user intends to target is actually the object that the user intends to target.

A decision tree is a tree-based model that represents decision rules using nodes connected by edges. Decision trees can be employed for classification or regression and can be trained using supervised learning techniques. Multiple decision trees can be employed in a random forest to significantly improve the accuracy of the resulting model. In a random forest, the collective output of the individual decision trees is employed to determine a final output of the random forest. For instance, in regression problems, the output of each individual decision tree can be averaged to obtain a final result. For classification problems, a majority vote technique can be employed, where the classification selected by the random forest is the classification selected by the most decision trees. One way to employ a decision tree or random forest is to classify user reaction signals as either indicating an error or no error perceived by a user in a given prediction.

A neural network is another type of machine learning model that can be employed for classification or regression tasks. In a neural network, nodes are connected to one another via one or more edges. A neural network can include an input layer, an output layer, and one or more intermediate layers. Individual nodes can process their respective inputs according to a predefined function, and provide an output to a subsequent layer, or, in some cases, a previous layer. The inputs to a given node can be multiplied by a corresponding weight value for an edge between the input and the node. In addition, nodes can have individual bias values that are also used to produce outputs. Neural networks can also be employed for classification of user reaction signals as indicating whether users perceive errors in predictions.

Various training procedures can be applied to learn the edge weights and/or bias values of a neural network. The term "internal parameters" is used herein to refer to learnable values such as edge weights and bias values that can be learned by training a machine learning model, such as a neural network. The term "hyperparameters" is used herein to refer to characteristics of model training, such as learning rate, batch size, number of training epochs, number of hidden layers, activation functions, etc.

A neural network structure can have different layers that perform different specific functions. For example, one or more layers of nodes can collectively perform a specific operation, such as pooling, encoding, decoding, alignment, prediction, or convolution operations. For the purposes of this document, the term "layer" refers to a group of nodes that share inputs and outputs, e.g., to or from external sources or other layers in the network. The term "operation" refers to a function that can be performed by one or more layers of nodes. The term "model structure" refers to an overall architecture of a layered model, including the number of layers, the connectivity of the layers, and the type of operations performed by individual layers. The term "neural network structure" refers to the model structure of a neural network. The term "trained model" and/or "tuned model" refers to a model structure together with internal parameters for the model structure that have been trained or tuned, e.g., individualized tuning to one or more particular users. Note that two trained models can share the same model structure and yet have different values for the internal parameters, e.g., if the two models are trained on different training data or if there are underlying stochastic processes in the training process.

Alternative Implementations

The discussion above focused on user gaze as an example of a user attention signal. However, in other implementations, EEG or other sensors can be used to infer spatial, audio, or tactile attention. For instance, consider a user gazing at a fixed position but shifting their peripheral vision to somewhere within field of view, a user using their ears to listen where the sound comes from (left or right), or a user that directs tactile attention to a particular finger that has received a stimulus. Additional details on spatial, auditory, and tactile attention can be found at An et al., "Decoding auditory and tactile attention for use in an EEG-based brain-computer interface," In 2020 8th International Winter Conference on Brain-Computer Interface (BCI), IEEE, 2020. pp. 1-6. In some implementations, spatial, auditory, and/or tactile attention as described in An et al. can be used to predict that a user is targeting a particular object. For instance, an EEG signal could be used to augment a gaze tracking signal to confirm that the user's attention is indeed focused on the location where a user is gazing, rather than having their attention focused at a peripheral location.

The discussion above focused on two types of user reaction signals—EEG signals and pupillary diameter measurements. However, a broad range of biosignals can be used to infer whether a user perceives an error in a given prediction. For instance, other reaction signals could reflect a user's heart rate, heart rate variability (HRV), perspiration rate (e.g., via a photoplethysmography (PPG) sensor), blood pressure, body temperature, body fat, blood sugar, blood oxygenation, etc. In addition, facial expressions, gestures, movement dynamics, etc., could be correlated to user perception of errors in predictions generated by a predictive model. Furthermore, in some cases, a user's physiological response could indicate a positive reaction rather than a negative reaction, e.g., an EEG measurement could convey that a user accepts a particular prediction as being correct or accurate.

One way to determine which potential user reaction signals to employ involves training a classifier, such as a neural network, with multiple reaction signals and determining whether the machine-trained classifier improves accuracy when using a given reaction signal. For instance, consider a neural network with a fully-connected output layer that outputs a binary classification of one or more reaction signals into two classes—error and no error. For a given use case, each reaction signal can be used to train such a model to determine whether accuracy is improved for that use case. Thus, for instance, for some applications using both EEG and pupillary diameter measurements as user reaction signals might result in significantly higher error detection accuracy than other applications, where EEG signals or pupillary diameter measurements alone might provide sufficient accuracy. Note that rule-based, heuristic approaches are also contemplated, e.g., an increase in pupil diameter above a percentage threshold could be considered indicative of an error without the use of a machine-trained model.

Note also that a wide range of applications can employ the disclosed techniques. As previously noted, text entry applications and gaming applications can employ the disclosed techniques to allow users to target virtual objects. As another example, consider augmented reality experiences where users might target real-world objects. For instance, assume a user visits an aquarium and observes multiple species of fish in a tank. An augmented reality application might allow the user to target a particular fish by pointing with their finger and, in response, the augmented reality application could output a spoken description of that fish species. If two fish are swimming nearby one another, respective targeting probabilities can be determined for both of the fish, and then a virtual overlay displayed over the predicted fish. If the correct fish is identified, the user can perform a selection gesture (e.g., an air tap) and the augmented reality application can output a verbal description of the selected fish. If the user reaction signal indicates an error, the overlay can be provided on the other fish and the user can then target the other fish and receive a corresponding verbal description, without providing an explicit indication that the first fish was not the fish they actually intended to target.

Furthermore, note that the disclosed techniques can be employed to improve targeting predictions in several ways. First, consider an eye tracking sensor that, over time, tends to output gaze coordinates that are somewhat to the left of where the user is actually gazing. Given enough error feedback via user reaction signals, an inference can be made that the gaze coordinates are off by a certain amount, e.g., an azimuth in degrees, a number of pixels, etc. The eye tracking sensor can be calibrated to the user based on implicit physiological feedback, without necessarily requiring the user to perform any explicit calibration steps.

Furthermore, consider a scenario where different models are employed to determine object targeting probabilities. As discussed above with respect to FIGS. 3A-3C, the user's gaze coordinates can be employed in isolation to predict which object a user is targeting. Consider another scenario where the trajectory of the targeting mechanism is used to augment the user gaze coordinates to predict which object the user is targeting. For instance, the trajectory of a cursor can be extrapolated to a particular object. Then, targeting probabilities obtained via gaze coordinates could be weighted by increasing the targeting probability of that particular object (e.g., by 10%) and reducing the targeting probabilities of other nearby objects. Over time, given enough reaction signals, it is possible to determine whether gaze-based targeting probabilities alone or trajectory-weighted gaze-based targeting probabilities are more accurate, and then the higher-accuracy model can be deployed while discarding the lower-accuracy model.

The discussion above also focused on a cursor as a targeting mechanism. However, as noted above, other visible indicators of targeted objects can be employed, and can be controlled in different ways by a user. For instance, consider a gaze tracking indicator, where the target that the user is gazing at is visually manipulated to flash, enlarge, contract, rotate, waggle, etc. In this example, the gaze tracking indicator can correspond to a targeting mechanism.

As another example, consider a verbal command tracking indicator, where a user speaks a verbal command (e.g., "apple"). If there are multiple (real or virtual) apples in the user's field of view (e.g., a red apple and a green apple), the red apple can be visually manipulated as described above to convey that the red apple has been targeted by the user's verbal command. If the user provides a negative response (e.g., "next apple") then the green apple can be visually manipulated instead. In this example, the visual indication of the targeted apple can correspond to a targeting mechanism. In still further cases, users can contract specific muscles (e.g., left arm vs. right arm) to target different objects, and visual indications can be provided to indicate which object has been targeted by the muscle contractions.

The discussion above also focused on using circles as boundaries around objects for the purpose of determining targeting probabilities. However, in other cases, different shapes can be employed. For example, in the case of an apple, a larger apple shape can be drawn as a boundary around the apple, and so on. In addition, in some cases targeting probabilities can be computed using different mathematical functions, e.g., a linear function based on the distance of coordinates from the center of an object, a decaying exponential function, and so on.

Technical Effect

Using the disclosed techniques, user attention and reaction signals can be collected in a wide range of computing scenarios that involve targeting of virtual objects, real-world objects, or both. Users do not necessarily need to explicitly reject a given predicted object that they did not intend to target, since the implicit physiological reaction can be used to trigger replacing the predicted objects with other objects when errors are detected. Consequently, user satisfaction and targeting accuracy can be improved.

More specifically, the use of a user attention signal can be used to predict that a user intends to target a particular object with a targeting mechanism before the user moves the targeting mechanism all the way to that object. Then, the predicted object can be visually identified so that the user is aware of which object they are predicted to target. In addition, as noted, haptic and/or audio feedback can also be output at this time to inform the user that the predicted object has been identified.

If the predicted object is correct, then the user can select the predicted object without having to navigate the targeting mechanism all the way to the predicted object. This reduces latency of user input and can increase productivity or performance of the user. On the other hand, if the predicted object is incorrect, this can be inferred based on the user reaction signal without requiring the user to provide explicit input indicating that the wrong object is predicted to be targeted. Thus, the predicted object can be updated to another predicted object in a very short period of time without waiting for the user to explicitly reject the prediction. This further reduces the latency of user input which in turn further improves user productivity or performance.

In addition, the disclosed techniques can also improve targeting accuracy. As noted previously, eye tracking sensors can be calibrated based on user reaction signals, thus improving the accuracy of the corresponding attention signal. In addition, targeting probability models can be chosen based on their accuracy as determined based on user reaction signals.

Furthermore, consider that some use cases may make it very difficult for a user to accurately target a given object by navigating a targeting mechanism. In some cases, a virtual or real-world object in the foreground can overlap a background object with very little unoccluded area visible on the object they wish to target. The disclosed techniques can reduce user frustration by automatically shifting the prediction to the occluded background object once a user reaction signal indicates that the user does not intend to target the foreground object.

As another example, consider users with fine motor impairments as a result of physical conditions such as aging, injury, or disease (e.g., shaky hands). Physically impaired users may find it very difficult to precisely control a targeting mechanism that is used with relative ease by unimpaired users. The disclosed techniques can allow such users to accurately and quickly target objects with relative ease, thus improving the user experience and making applications usable for a broader range of users.

Device Implementations

As noted above with respect to FIG. 1, system 100 includes several devices, including a wearable device 110, a client device 120, a client device 130, and a server 140. As also noted, not all device implementations can be illustrated, and other device implementations should be apparent to the skilled artisan from the description above and below.

The term "device", "computer," "computing device," "client device," and or "server device" as used herein can mean any type of device that has some amount of hardware processing capability and/or hardware storage/memory capability. Processing capability can be provided by one or more hardware processors (e.g., hardware processing units/cores) that can execute computer-readable instructions to provide functionality. Computer-readable instructions and/or data can be stored on storage, such as storage/memory and or the datastore. The term "system" as used herein can refer to a single device, multiple devices, etc.

Storage resources can be internal or external to the respective devices with which they are associated. The storage resources can include any one or more volatile or non-volatile memory, hard drives, flash storage devices, and/or optical storage devices (e.g., CDs, DVDs, etc.), among others. As used herein, the term "computer-readable medium" can include signals. In contrast, the term "computer-readable storage medium" excludes signals. Computer-readable storage media includes "computer-readable storage devices." Examples of computer-readable storage devices include volatile storage media, such as RAM, and non-volatile storage media, such as hard drives, optical discs, and flash memory, among others.

In some cases, the devices are configured with a general-purpose hardware processor and storage resources. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality. Thus, the term "processor," "hardware processor" or "hardware processing unit" as used herein can also refer to central processing units (CPUs), graphical processing units (GPUs), neural processing units (NPUs), controllers, microcontrollers, processor cores, or other types of processing devices suitable for implementation both in conventional computing architectures as well as SOC designs.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In some configurations, any of the modules/code discussed herein can be implemented in software, hardware, and/or firmware. In any case, the modules/code can be provided during manufacture of the device or by an intermediary that prepares the device for sale to the end user. In other instances, the end user may install these modules/code later, such as by downloading executable code and installing the executable code on the corresponding device.

Also note that devices generally can have input and/or output functionality. For example, computing devices can have various input mechanisms such as keyboards, mice, touchpads, voice recognition, gesture recognition (e.g., using depth cameras such as stereoscopic or time-of-flight camera systems, infrared camera systems, RGB camera systems or using accelerometers/gyroscopes, facial recognition, etc.). Devices can also have various output mechanisms such as printers, monitors, etc.

Also note that the devices described herein can function in a stand-alone or cooperative manner to implement the described techniques. For example, the methods and functionality described herein can be performed on a single computing device and/or distributed across multiple computing devices that communicate over network(s) 150. Without limitation, network(s) 150 can include one or more local area networks (LANs), wide area networks (WANs), the Internet, and the like.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

Various examples are described above. Additional examples are described below. One example includes a method comprising receiving a user attention signal conveying where a user directs attention, based on the user attention signal, identifying a predicted object that the user intends to target with a targeting mechanism, outputting a visual identification of the predicted object, receiving a user reaction signal conveying a physiological reaction of the user to the visual identification of the predicted object, and in an instance when the physiological reaction of the user indicates an error, identifying another predicted object that the user intends to target with the targeting mechanism.

Another example can include any of the above and/or below examples where the method further comprises, responsive to receiving a selection input, performing a selection action on the another predicted object.

Another example can include any of the above and/or below examples where the predicted object is a first character, the another predicted object is a second character, and the selection action involves entering the second character into a text entry region on a display.

Another example can include any of the above and/or below examples where the targeting mechanism comprises a cursor.

Another example can include any of the above and/or below examples where the visual identification of the predicted object involves changing at least one of color, size, or font of the first character.

Another example can include any of the above and/or below examples where the method further comprises outputting haptic feedback concurrently with the visual identification of the predicted object.

Another example can include any of the above and/or below examples where the haptic feedback is provided via a controller.

Another example can include any of the above and/or below examples where the method further comprises receiving navigation inputs from the controller, the navigation inputs moving the targeting mechanism on a trajectory toward the predicted object and when the targeting mechanism reaches a threshold distance from the predicted object, performing a jump action that moves the targeting mechanism to the predicted object.

Another example can include any of the above and/or below examples where the method further comprises determining respective targeting probabilities for a plurality of objects based at least on the user attention signal.

Another example can include any of the above and/or below examples where the predicted object has a highest targeting probability and the another predicted object has a next-highest targeting probability.

Another example can include any of the above and/or below examples where the respective targeting probabilities are based at least on attention-based coordinates derived from the user attention signal.

Another example can include any of the above and/or below examples where the respective targeting probabilities are based on respective distances from the attention-based coordinates to respective centers of each of the objects.

Another example can include any of the above and/or below examples where the predicted object and the another predicted object are displayed in a virtual or augmented reality experience.

Another example includes a system comprising a processor and a computer-readable storage medium storing instructions which, when executed by the processor, cause the system to: based at least on a user attention signal, identify a predicted object that a user intends to target, output an identification of the predicted object, based on a user reaction signal indicating that the predicted object is erroneous, identify another predicted object that the user intends to target, and perform a selection action on the another predicted object responsive to a selection input.

Another example can include any of the above and/or below examples where the system further comprises an electroencephalogram sensor configured to provide an electroencephalogram signal as the user reaction signal.

Another example can include any of the above and/or below examples where the instructions, when executed by the processor, cause the system to determine that the electroencephalogram signal indicates that the user perceives an error when the electroencephalogram signal includes an error-related potential within a specified time window after the outputting the identification of the predicted object.

Another example can include any of the above and/or below examples where the method further comprises an eye tracking sensor configured to provide a gaze tracking signal as the user reaction signal.

Another example can include any of the above and/or below examples where the instructions, when executed by the processor, cause the system to calibrate the eye tracking sensor based at least on the user reaction signal.

Another example includes A computer-readable storage medium storing instructions which, when executed by a computing device, cause the computing device to perform acts comprising receiving a user attention signal conveying where a user directs attention, based on the user attention signal, identifying a predicted object that the user intends to target with a targeting mechanism, outputting a visual identification of the predicted object, receiving a user reaction signal conveying a physiological reaction of the user to the visual identification of the predicted object, and in an instance when the physiological reaction of the user indicates an error, identifying another predicted object that the user intends to target with the targeting mechanism.

Another example can include any of the above and/or below examples where the user reaction signal comprises a pupil diameter measurement.

The invention claimed is:

1. A method comprising:
   receiving a user attention signal conveying where a user directs attention;
   based at least on the user attention signal, identifying a predicted object that the user intends to target with a targeting mechanism;
   outputting a visual identification of the predicted object;
   receiving a user reaction signal conveying an implicit physiological reaction of the user to the visual identification of the predicted object; and
   in an instance when the implicit physiological reaction of the user indicates an error, identifying another predicted object that the user intends to target with the targeting mechanism.

2. The method of claim 1, further comprising:
   responsive to receiving a selection input, performing a selection action on the another predicted object.

3. The method of claim 2, wherein the predicted object is a first character, the another predicted object is a second character, and the selection action involves entering the second character into a text entry region on a display.

4. The method of claim 3, wherein the targeting mechanism comprises a cursor.

5. The method of claim 4, wherein the visual identification of the predicted object involves changing at least one of color, size, or font of the first character.

6. The method of claim 1, further comprising:
   outputting haptic feedback concurrently with the visual identification of the predicted object.

7. The method of claim 6, wherein the haptic feedback is provided via a controller.

8. The method of claim 7, further comprising:
   receiving navigation inputs from the controller, the navigation inputs moving the targeting mechanism on a trajectory toward the predicted object; and
   when the targeting mechanism reaches a threshold distance from the predicted object, performing a jump action that moves the targeting mechanism to the predicted object.

9. The method of claim 1, further comprising determining respective targeting probabilities for a plurality of objects based at least on the user attention signal.

10. The method of claim 9, wherein the predicted object has a highest targeting probability and the another predicted object has a next-highest targeting probability.

11. The method of claim 10, wherein the respective targeting probabilities are based at least on attention-based coordinates derived from the user attention signal.

12. The method of claim 11, wherein the respective targeting probabilities are based at least on respective distances from the attention-based coordinates to respective centers of each of the objects.

13. The method of claim 1, wherein the predicted object and the another predicted object are displayed in a virtual or augmented reality experience.

14. A system comprising:
   a processor; and
   a computer-readable storage medium storing instructions which, when executed by the processor, cause the system to:
   based at least on a user attention signal, identify a predicted object that a user intends to target;
   output an identification of the predicted object;
   receiving a user reaction signal conveying an implicit physiological reaction of the user to the identification of the predicted object;
   in an instance when the user reaction signal indicates that the predicted object is erroneous;
   identify another predicted object that the user intends to target; and
   perform a selection action on the another predicted object responsive to a selection input.

15. The system of claim 14, further comprising an electroencephalogram sensor configured to provide an electroencephalogram signal as the user reaction signal.

16. The system of claim 15, wherein the instructions, when executed by the processor, cause the system to:
   determine that the electroencephalogram signal indicates that the user perceives an error when the electroencephalogram signal includes an error-related potential within a specified time window after the outputting the identification of the predicted object.

17. The system of claim 14, further comprising an eye tracking sensor configured to provide a gaze tracking signal as the user reaction signal.

18. The system of claim 17, wherein the instructions, when executed by the processor, cause the system to:
   calibrate the eye tracking sensor based at least on the user reaction signal.

19. A computer-readable storage medium storing instructions which, when executed by a computing device, cause the computing device to perform acts comprising:
- receiving a user attention signal conveying where a user directs attention;
- based at least on the user attention signal, identifying a predicted object that the user intends to target with a targeting mechanism;
- outputting a visual identification of the predicted object;
- receiving a user reaction signal conveying an implicit physiological reaction of the user to the visual identification of the predicted object; and
- in an instance when the implicit physiological reaction of the user indicates an error, identifying another predicted object that the user intends to target with the targeting mechanism.

20. The computer-readable storage medium of claim 19, wherein the user reaction signal comprises a pupil diameter measurement.

* * * * *